Figure 1:
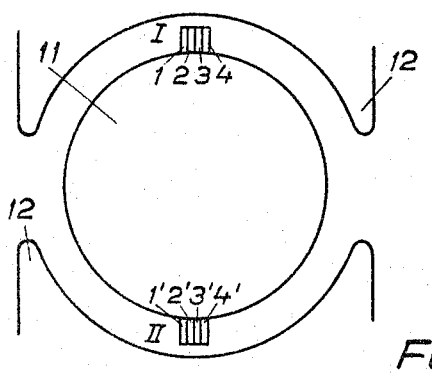

April 30, 1968     K. D. MADSEN ET AL     3,381,154

HIGH POWER SYNCHRONOUS MACHINE

Filed April 5, 1965

INVENTOR.
KRISTIAN DAHL MADSEN
SVEN HELMERSSON
RICHARD SIVERTSEN
BY Bailey, Stephens & Huettig April 30, 1968  K. D. MADSEN ET AL  3,381,154

HIGH POWER SYNCHRONOUS MACHINE

Filed April 5, 1965  3 Sheets-Sheet 2

INVENTORS
KRISTIAN DAHL MADSEN
SVEN HELMERSSON
RICHARD SIVERTSON
BY
Bailey, Stephens &
Huettig

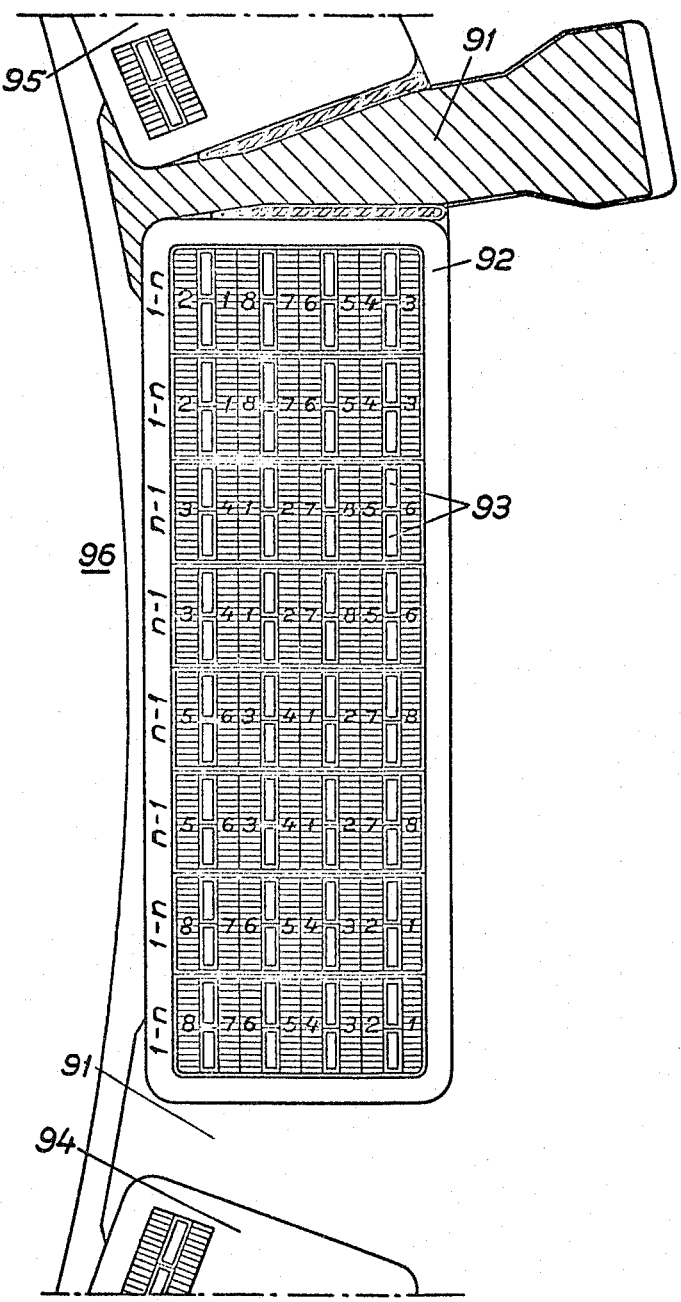

United States Patent Office 3,381,154
Patented Apr. 30, 1968

3,381,154
HIGH POWER SYNCHRONOUS MACHINE
Kristian Dahl Madsen, Sven Helmersson, and Richard Sivertsen, Vasteras, Sweden, assignors to Allmänna Svenska Elektriska Aktiebolaget, Vasteras, Sweden, a Swedish corporation
Filed Apr. 5, 1965, Ser. No. 445,448
Claims priority, application Sweden, Apr. 8, 1964, 4,305/64
7 Claims. (Cl. 310—213)

The present invention relates to a high power synchronous machine with a slotless armature, that is, a high power machine where the air gap flux at least for the most part is conducted into the armature iron without passing the armature teeth.

In conventional high power machines it is known to divide the active part of the armature conductor into a number of part conductors which are transposed or twisted in the slot. With the known constructions the armature conductor usually consists of several part conductors whose height, that is, their dimension perpendicular to the air gap surface, is considerably less than their width. This is even the case regarding the previously known high power machines with slotless drum armatures.

By investigations made in connection with the development work which is the basis of the invention it has however been realised that with a slotless drum armature it is not possible, to the necessary extent, to prevent inner circulating current in the armature conductor by using a divided armature conductor of conventional construction.

As distinguished from that which is the case with an armature provided with slots, the armature conductor in a slotless drum armature is not only penetrated by a leakage flux, but by the induction lines of the main flux, which are substantially directed perpendicularly to the air gap surface. Since the flux density varies along the armature—usually according to a sine curve—the induced voltage in a solid conductor rod arranged on the active part of the armature will receive different values at rod parts with different positions in the direction of rotation, with the result that inner circulating currents with corresponding losses occur in the rod. Said voltage difference increases with the width of the rod in question.

According to the invention the eddy currents caused by the field component which is parallel with the air gap surface is counteracted by subdividing the conductor cross section into a number of part conductor groups which lie one after the other in the direction perpendicular to the air gap surface, and transposing these groups in a similar way to the part conductors in conventional machines. The difference lies in that certain conditions must be fulfilled if a compensation of the very strong field component directed perpendicularly to the air gap surface is to be reached, which among other things involves a fine subdivision of said groups in a direction parallel to the air gap surface.

The invention relates to a multi-phase high power asynchronous machine intended for a continuous power of at least 10 mva. and whose armature substantially is made as a slotless armature, where the air gap flux is led at least mainly into the armature core without passing armature teeth, characterised in that the active armature conductors of the armature winding consist of a number of active part conductor groups insulated from each other, and that several active part conductor groups in each active armature conductor are arranged beside each other in a direction perpendicular to the air gap surface of the armature and that each one of the part conductor groups thus arranged contains a plurality of straight active part conductors insulated from each other by means of a relatively thin insulation layer, said active part conductors being arranged beside each other in a direction perpendicular to said direction, and that each assembly of series connected armature conductors between two points of mutual connections between adjacent part conductors consists of pairs of active conductors, the mutual displacement between each armature conductor of the pair being substantially 180 electrical degrees, whereas each active pair conductor of a certain successive number, in the direction of rotation in one of the active conductors of said pair, is series connected with an active part conductor with the same successive number reckoned in the opposite direction of rotation in the other active conductor of the pair.

Figure 2:
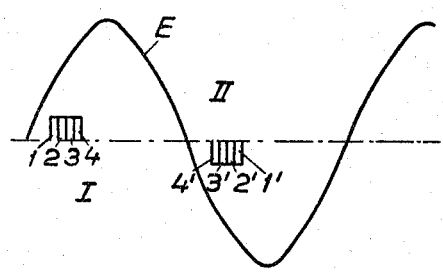
Figure 3:
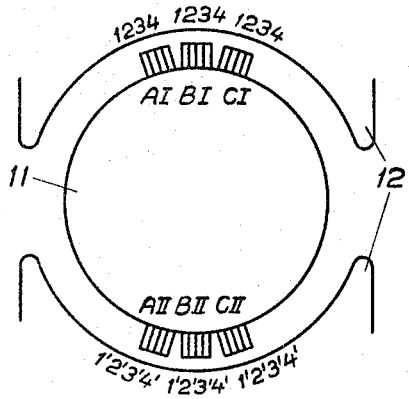
Figure 4:
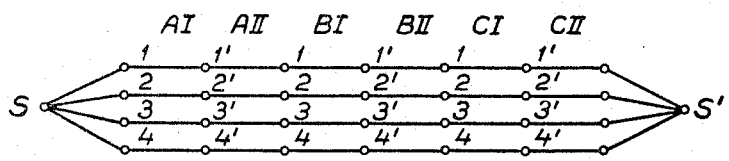
Figure 5:
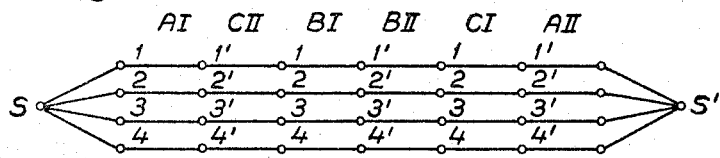
Figure 6:
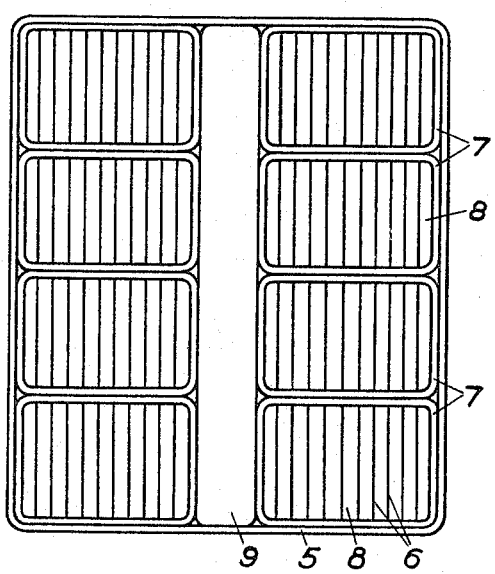
Figure 7:
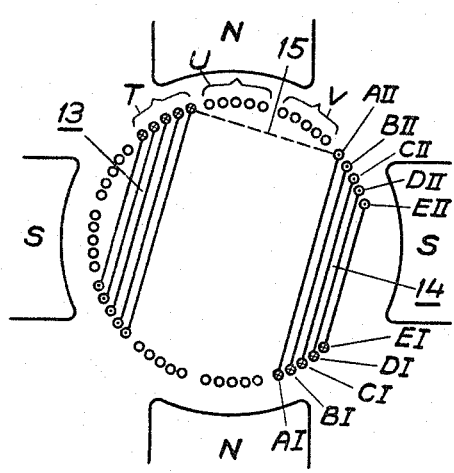
Figure 8:
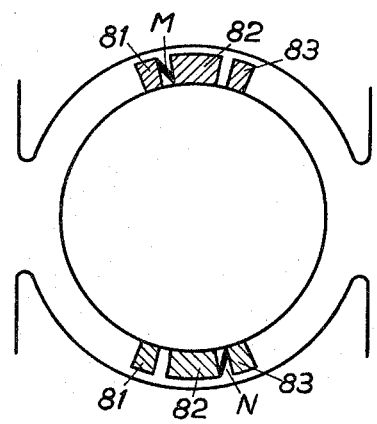

In the following the invention will be explained and described with reference to the accompanying drawings, where FIG. 1 and FIG. 2 generally illustrate the conditions in a slotless armature where the armature conductor is divided into part conductors arranged tangentially beside each other, and FIG. 3 shows a winding phase of such a machine. FIG. 4 and FIG. 5 show the connection diagram for the part conductor in two different embodiments, and FIG. 6 shows in section an embodiment of the armature conductor according to the invention. FIG. 7 and FIG. 8 show two embodiments where the tangential component of the main flux is compensated by transposing the groups of part conductors, and where this is carried out by a 180° twisting. FIG. 9 shows an embodiment where the transposing of said groups is of a more complicated kind.

In FIG. 1 and FIG. 2, I and II are two active armature conductors of a two-pole synchronous machine which are arranged on the cylindrical surface of the magnet core 11 in a slotless armature with a distance of 180 electrical degrees from each other and which belong to one and the same conductor turn. The active armature conductors are divided into four part conductors lying tangentially beside each other, 1, 2, 3 and 4 and 1', 2', 3' and 4' respectively which are arranged parallel with each other. The end windings are subdivided into parallel part conductors in a similar way to the active rotor conductors. The active part conductors 1 and 1' thus belong to one and the same part conductor turn, in the same way as 2 and 2', 3 and 3', and 4 and 4'.

It is further evident from FIG. 1 that the angle between the active part conductors 1 and 4' is 180 electrical degrees, which is also true for the active part conductors 2 and 3', 3 and 2', and 4 and 1'.

The generation of voltage in the active part conductors can then be suitably illustrated by means of FIG. 2, where the curve B shows the flux density along the circumference of the armature and where the position of the active part conductors in relation to the flux curve is shown at an arbitrary rotor position of an outer pole machine. Assuming that the flux is purely radial and follows a sine curve as shown in the figure, it can be seen that the sum of induced voltages in one pair of series connected active part conductors is very nearly constant from turn to turn.

In FIG. 2 the conductors I and II are drawn with relatively large width in relation to the pole pitch. In reality this width is made considerably less in a machine according to the invention, and the difference between the voltages which are induced in different cross sectional parts in one and the same part conductor turn can be overlooked, at least when the curve B is a pure sine curve.

If all the conductor turns are wound diametrically, like the turn shown in FIG. 1, the inner circulating currents in the winding generated by a radial sine flux can be reduced to a very low value by only dividing up the rotor conductors in a tangential direction and without turning the conductors. It is then sufficient that the part conductors within each of the conductor turns are insulated from each other.

In a synchronous machine with a slotless drum armature it may however be advantageous to wind each phase with uncrossed turns, which means that the turn step, that is the electrical angle between the two active rotor conductors in one turn, is less than 180° for the conductor turn which lies on both sides of the centre conductor turn of the winding phase. Such a winding phase for a two-pole machine is shown on FIG. 3, where AI and AII show the two active conductors in the coil A, BI and BII corresponding to coil B, and so on.

FIG. 4 shows a connection diagram for the phase winding shown in FIG. 3. Four parallel connected groups of series connected part conductors constitute a winding phase whose end points are designated with S and S'. Within each of these groups part conductor turns of the same tangential succession within their corresponding conductors are series connected.

If instead one imagines the winding phase in FIG. 3 wound in such a way that the pitch becomes 180 electrical degrees for each turn, that is in the same way as for the coil in FIG. 1, the connection diagram shown in FIG. 5 is obtained.

Since the only difference between FIG. 4 and FIG. 5 is the different succession of the active part conductors, the eddy current reduction obtained with a pure radial flux in an armature winding like the one shown in FIG. 3 is equal to the reduction obtained at only 180 degrees turn pitch and this reduction is in the former as well as in the latter case obtained without any turning or transposing of the part conductors. In order that the desired voltage compensation shall take place with the shown arrangement, it is necessary that the groups of series connected part conductors are insulated from each other through the whole winding phase and that each one of the active armature conductors in the winding phase lies 180 electrical degrees from some other active conductor in the same winding phase.

Since a machine according to the invention is without armature teeth or is only provided with teeth which—magnetically speaking—have relatively small importance, it is suitable to use an air gap flux density whose average value lies considerably higher than in machines with slotted armatures. For this reason, and because the armature conductors are penetrated by the induction lines of the main flux and not only by a relatively weak stray flux, it is necessary to sub-divide the conductor cross section to a far greater extent than for conventional machines. Thereby the winding manufacture gets more complicated and expensive, but examinations have shown that an extremely high degree of sub-division in spite of this is the only way to a satisfactory machine.

In a high power machine with a slotless drum armature it is not technically and economically feasible to use part conductors whose tangential dimensions are greater than 2 mm. In most cases the optimum part conductor width falls between 0.4–1.0 mm. at a frequency of 50–60 cycles per second.

In FIG. 6 a special construction intended for armature conductors in a machine according to the invention is shown. By means of this construction a composite armature conductor is obtained which with moderate manufacturing costs fulfills the requirement of small part conductor width, high space factor, well defined part conductor position and flexibility of the conductor. The conductor is insulated with a surrounding conductor insulation 5 of glass tape and contains eight part conductor groups of which each one is covered with a group insulation 7 of glass fibre, the group insulation being relatively thick in relation to the part conductor insulation 6. Each active part conductor group contains eleven active part conductors 8 arranged beside each other in the direction of rotation. The width of the part conductors is 0.54 mm. By means of a cooling duct 9 the armature conductor is divided into two halves, each of which consists of four part conductor groups arranged beside each other in a direction perpendicular to the direction of rotation. The part conductors within each part conductor group are enameled and glued together with each other along the active part as well as at the end windings and the glass fibre wound part conductor groups of several turns thus form a prefabricated unit, which with advantage can be manufactured mechanically.

As mentioned, the field components which are directed at right angles to the pole surface are much stronger than the components parallel to the pole surface. In the following description a radial air gap is assumed and the said components are therefore described as radial and tangential components respectively. The tangential components are particularly strong at the pole edges.

In spite of the fact that the tangential component is considerably less than the radial component, it is of great importance that the corresponding eddy current is prevented as effectively as possible. When, in a machine with a slotless armature, a twisting or transposing of a conductor is to be carried out in order to counteract inner circulating currents caused by the tangential component of the field, it must simultaneously be ensured that the correct rules for a correct arrangement of the part conductors in relation to the radial flux component are strictly obeyed.

If a machine according to the invention is made with a number of poles which is divisible by 4 and half the phase winding consists of a number of series connected conductor pairs in which the conductors are displaced in relation to each other by 180 electrical degrees, one may quite simply twist the conductor in the middle of the winding phase and thereby effect a considerable reduction of the undesired influence of the tangential field component without any resulting alteration of the particular conditions necessary for a compensation of the radial component. Such a machine with four poles is shown in FIG. 7, where the rotor 11 is provided with a three phase winding whose winding phases are designated by T, U and V. Each phase contains groups of armature conductors arranged tangentially immediately beside each other, which groups are distributed along the rotor circumference with a mutual distance equal to the pole division.

In the figure the end windings are only drawn for the winding phase T. The winding phase T contains two equal coils 13 and 14 which each constitute a group of ten series connected armature conductors and each group can from an analytical point of view be interpreted as consisting of five pairs of active armature conductors arranged with 180 electrical degrees between the two armature conductors in each pair and accordingly the radial flux within each of the coils 13 and 14 induces the same voltage in each group of mutually series connected part conductors. The two coils 13 and 14 are connected with each other by means of the middle part 15 of the winding phase while maintaining the distinction of the part conductors or at least the part conductor groups, whereby the conductor in the same way as for the other part of the winding phase is made with the cross section shown in FIG. 6. The middle part 15 is twisted 180°, which means that the part conductor groups which lie radially outwards in the coil 13, will lie radially inwards in the coil 14, with the result that the tangential component of the flux in each one of the part conductor groups will induce approximately the same voltage between the end points of the winding phase T. Corresponding conditions exist in the other phase windings of the armature winding.

At a two-pole machine according to the invention, it is not possible to take into consideration the two components of the flux by means of the winding arrangement mentioned above and described in connection with FIG. 6 and FIG. 7. In cases where the armature winding is made with at least two layers arranged in the radial direction of the armature conductor, the conductor can instead be twisted 180° at the transfer from one layer to another.

Even in the last mentioned embodiment it is of course necessary that adjacent part conductors are insulated from each other at least within each layer and that the part conductor groups are insulated from each other also during the transfer from layer to layer. Even if there is not an equal number of layers, a good voltage compensation is achieved in this way, since the eddy currents in the surplus layer can only be closed through the other layers and thus be reduced by relatively great resistances.

If a machine according to the invention is made with only one pair of poles and only one layer of active rotor conductors, the undesired effect of the tangential component can be counteracted with a subdivided conductor according to the invention, in the first place by winding the turns of the winding phase so that they are symmetrically distributed on both sides of an axial plane through the winding phase, and in the second place by making two 180° twists inside the winding phase in such a way that a middle part which constitutes half the winding phase is situated between the two turning points as shown in FIG. 8, where 82 designates said middle part and 81 and 83 two equal parts of the winding phase arranged on both sides of the middle part 82. The part conductors and part conductor groups of the conductor are insulated from each other through the whole phase winding. On the figure, M indicates the place where the conductor goes over from the part 81 to the centre part 82, and where the conductor is twisted 180°. The transfer between the centre part 82 and the phase part 83 is designated by N, and also here the conductor is twisted 180°.

Since the total twisting of the conductor between the parts 81 and 83 makes 360° or 0°, the part conductors of these parts are mutually oriented exactly as if no twisting had taken place, which means that the part conductor voltages induced by the radial component of the flux will balance out each other in the half of the winding phase consisting of the parts 81 and 83. At the same time it has been achieved that the same part conductor groups which in the parts 81 and 83 lie nearest to the rotor are series connected with part conductor groups which in the middle part 82 lie nearest to the stator, and vice versa.

In the embodiments of the invention described above, it has been shown how, in a relatively simple way, a transposing of the part conductor groups can be effected by simply twisting the conductor 180°. Only two different configurations of the part conductor groups are used. In certain cases it can however be of great importance to operate with a greater number of configurations and a more complicated transposing of the part conductors. The reason for this lies in the fact that it often is not possible to prevent the field curve of the machine from containing harmonics of considerable amplitude in addition to the fundamental field variation. If one accordingly extends the considerations made in connection with FIG. 1 and FIG. 2 by adding harmonics to the shown sine curve, it can be seen that quite a good compensation of the odd harmonics can be reached, while the even harmonics give rise to eddy currents which are not reduced by the arrangement shown on FIG. 1.

During the development of machines according to the invention, a great number of different configurations of the part conductor group have been examined and thereby certain rules have been arrived at which must be followed if, even in the presence of even harmonics in the field curve, a satisfactory reduction of the eddy current losses shall be reached.

FIG. 9 shows an example of a machine according to the invention where the armature winding is made in agreement with said conditions, a résumé of which is given below. In the figure, 91 designates teeth intended for retaining the armature winding. Each winding phase consists of three parts series connected immediately after each other, each part containing two conductor groups arranged at a mutual distance of 180 electrial degrees.

In the figure such a group is designated by 96. It is provided with coil insulation 92. The shown conductor group comprises a coil side and the phase winding thus contains three series connected coils. All the armature conductors in one coil are series connected and each active armature conductor consists of eight active part conductor groups, which are grouped in pairs at both sides of cooling ducts 93.

Each active part conductor group consists of $n$ active part conductors arranged tangentially beside each other, on which $n$, for example, can be equal to 14. The part conductor groups are numbered on the drawing and part conductor groups with the same numbers are series connected and insulated from part conductor groups with different numbers through the whole phase winding. In a similar way the part conductors are numbered and part conductors with the same numbers are series connected and insulated from part conductors with different numbers at least through one of the three coils. The part conductors are arranged at each coil side in consecutive numbers in the direction of rotation of some of the active armature conductors, and on the other conductors of the coil side in the opposite succession. This is shown on the figure by each armature conductor being marked with $1-n$, $n-1$, respectively. The two coil sides in one coil are symmetrical with each other, also with regard to the numbering. As is evident from FIG. 9, the active armature conductors are arranged symmetrically in relation to an axial plane through the centre of the coil side, with part conductor succession $1-n$, and $n-1$. By methodical examination of different configurations of the part conductor groups it has been found that all the configurations, which in spite of strong even harmonics give a satisfactory reduction of the eddy currents, imply a similar symmetrical arrangement. The coil sides 94 and 95 partly depicted on the figure, have a similar symmetry.

We claim:

1. Multi-phase high power synchronous machine intended for a continuous power of at least 10 mva. and whose armature substantially is made as a slotless armature, in which the air gap flux at least mainly is led into the armature core without passing armature teeth, the active armature conductors of the armature winding comprising a plurality of active part conductor groups insulated from each other, a plurality of active part conductor groups in each active armature conductor being arranged beside each other in a first direction perpendicular to the air gap surface of the armature, each of the part conductor groups thus arranged containing a plurality of straight active part conductors insulated from each other by means of a relatively thin insulation layer, said active part conductors being arranged beside each other in a second direction perpendicular to said first direction, each assembly of series connected armature conductors between two points of mutual connections between adjacent part conductors comprising pairs of active conductors, the mutual displacement between each armature conductor of the pair being substantially 180 electrical degrees, each active part conductor of a certain successive number in the direction of rotation of one of the active conductors of said pair being series connected with an active part conductor with the same successive number reckoned in the opposite direction of rotation of the other active conductor of the pair.

2. High power synchronous machine according to claim 1, the largest tangential dimension of said part conductor being greater than 0.4 mm. and less than 2 mm. at a frequency of 50–60 cycles per second of the machine.

3. High power synchronous machine according to claim 1, each winding phase comprising a number of winding parts series connected immediately after each other, each winding part containing two conductor groups arranged at a mutual distance of substantially 180 electrical degrees, each conductor group containing a plurality of series connected active armature conductors placed at the air gap surface of the armature immediately beside each other in the direction of rotation, each conductor group containing conductors whose part conductors have a first succession in the direction of rotation, as well as conductors whose part conductors have a second succession opposite to the first succession, the conductors of the first and second successions within each conductor group being symmetrically arranged on each side of an axial plane through the centre of the conductor group.

4. High power machine according to claim 1, series connected active part conductor groups having the same sequence number and belonging partly to a first and partly to a second group of active armature conductors, whereas the sequence number of said first group of active armature conductors is reckoned from the air gap surface and outwards, and of said second group of active armature conductors in the opposite direction, the active armature conductors within each conductor group constituting a plurality of pairs, the distance between the two active armature conductors of each pair being substantially 180 electrical degrees.

5. High power synchronous machine according to claim 4, the number of poles of the machine being a multiple of 4, said first groups of active armature conductors with corresponding end connections forming the first of two series connected halves of the winding phase, while said second groups with corresponding end connections form the other.

6. High power synchronous machine according to claim 4, the active conductors of each winding phase being distributed in several layers which are parallel with the air gap surface of the armature, each layer containing only active armature conductors belonging to one of said groups of active armature conductors.

7. High power synchronous machine according to claim 3, the machine having two poles, each winding phase comprising one single layer of active conductors, the winding phase comprising a middle part, which forms the one half of the winding phase and only contains armature conductors of said first group, and two mutually equal side parts, which are series connected with the middle part and together form the second half of the winding phase, said second half only containing armature conductors belonging to said second group of active armature conductors.

References Cited
UNITED STATES PATENTS

| | | | |
|---|---|---|---|
| 302,557 | 7/1884 | Freeman | 310—265 |
| 1,390,063 | 9/1921 | Taylor et al. | 310—213 |
| 2,921,207 | 1/1960 | Fletcher | 310—208 |
| 3,260,978 | 7/1966 | Muller | 310—213 |

MILTON O. HIRSHFIELD, *Primary Examiner.*

L. L. SMITH, *Assistant Examiner.*